United States Patent [19]

Cooke

[11] 4,109,943

[45] Aug. 29, 1978

[54] HOSE FITTING ASSEMBLY

[75] Inventor: Horise M. Cooke, Weatherford, Tex.

[73] Assignee: Stratoflex, Inc., Fort Worth, Tex.

[21] Appl. No.: 846,596

[22] Filed: Oct. 28, 1977

Related U.S. Application Data

[63] Continuation of Ser. No. 712,785, Aug. 9, 1976, abandoned.

[51] Int. Cl.² ............................................. F16L 39/02
[52] U.S. Cl. .................................................... 285/149
[58] Field of Search ............................... 285/149, 249

[56] References Cited

U.S. PATENT DOCUMENTS

| 2,853,319 | 9/1958 | Press | 285/149 X |
| 3,044,163 | 7/1962 | Bacher et al. | 285/149 X |
| 3,083,989 | 4/1963 | Press | 285/149 X |
| 3,907,335 | 9/1975 | Burge et al. | 285/249 X |

FOREIGN PATENT DOCUMENTS

| 251,193 | 4/1964 | Australia | 285/149 |
| 2,501,108 | 7/1975 | Fed. Rep. of Germany | 285/149 |
| 610,435 | 10/1960 | Italy | 285/149 |
| 764,830 | 1/1957 | United Kingdom | 285/149 |
| 837,045 | 6/1960 | United Kingdom | 285/149 |

*Primary Examiner*—Thomas F. Callaghan
*Attorney, Agent, or Firm*—Merriam, Marshall & Bicknell

[57] ABSTRACT

This disclosure deals with a fitting designed to be secured to an end of a flexible hose of the type including an inner tube surrounded by a wire reinforcement. The fitting includes a nipple, a sleeve and a socket. The nipple has a tubular part which is inserted into the end of the inner tube. The sleeve includes an insert part that is positioned between the end of the inner tube and the wire, and the socket is located around the tubular part of the nipple and around the sleeve. The socket is attached to the nipple, and the end of the wire reinforcement is clamped between the socket and the outer surface of the sleeve. The end of the inner tube is located in a pocket formed between the nipple and the insert part. During assembly of the fitting, the socket causes deformation of the insert part of the sleeve and initial compression on the end of the inner tube which is in the pocket. This initial compression combined with barbs formed on the insert, serve to secure the end of the tube in the pocket. Fluid pressure internally of the hose serves to activate a gland seal formed by the end of the tube in the pocket. Tapered surfaces of the socket and the insert part cooperate to deform the insert part in an advantageous manner.

4 Claims, 6 Drawing Figures

HOSE FITTING ASSEMBLY

This is a continuation, of application Ser. No. 712,785, filed Aug. 9, 1976, and now abandoned.

Hose fittings have been provided in the past, including a sleeve or insert which cooperates with the end portion of the hose, referred to as a "gland", to form a gland seal. U.S. Pat. Nos. 3,140,106, 3,423,109, and 2,833,567 show such fittings. In some fittings of this character, the gland is maintained substantially free of compression by the fitting parts, as discussed in U.S. Pat. No. 2,833,567. According to U.S. Pat. No. 2,833,567, the fluid pressure internally of the hose forces the gland radially outwardly against the inner surface of the sleeve, and thereby forms a fluid tight seal. In other fittings, such as that shown in U.S. Pat. No. 2,463,293, the inner tube is compressed by the fittings parts, but it appears that the seal is no more than an ordinary compression seal.

It is a general object of the present invention to provide an improved fitting having both a gland seal and a compression seal, wherein the seals are more effective than those of the prior art.

It is a further object to provide such a fitting which includes both a gland seal and a compression seal, and a metal-to-metal seal between the sleeve and the nipple.

It is a still further object to provide a field assembled hose and fitting assembly having improved fluid tight seals.

Apparatus in accordance with the present invention comprises a fitting for connection to the end of a hose including an inner tube and an outer wire reinforcement, the fitting including a nipple having a tubular part positioned in an end portion of the inner tube, a sleeve including an insert part positioned between the end portion of the inner tube and the wire, a gland pocket for the end portion of the inner tube being formed between the nipple and the insert part, and a socket secured to the nipple and positioned around the wire reinforcement and the sleeve, the wire reinforcement being tightly clamped between the sleeve, and the socket, at least one barb being formed on the inner surface of said insert part and tightly engaging said inner tube, and said insert part in the area of said barb being deformed by said socket radially inwardly into tight engagement with said end portion of said inner tube.

The foregoing and other objects and advantages of the present invention will become more apparent from the following detailed description taken in conjunction with the accompanying figures of the drawings, wherein.

Figure 1:
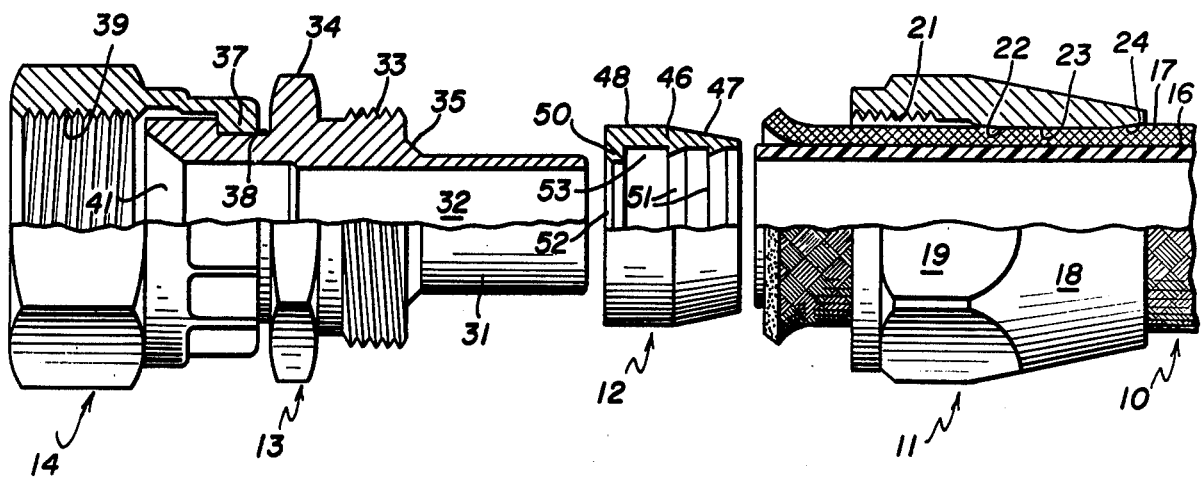
FIG. 1 is an exploded view partially in section of a hose and fitting assembly embodying the invention.
Figure 2:
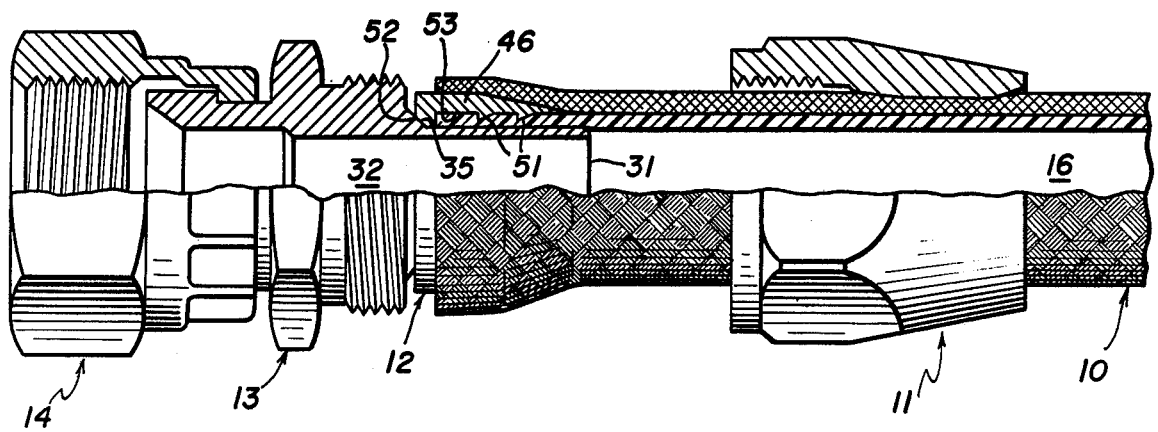
FIG. 2 is a view similar to FIG. 1 but showing the parts during assembly.
Figure 3:
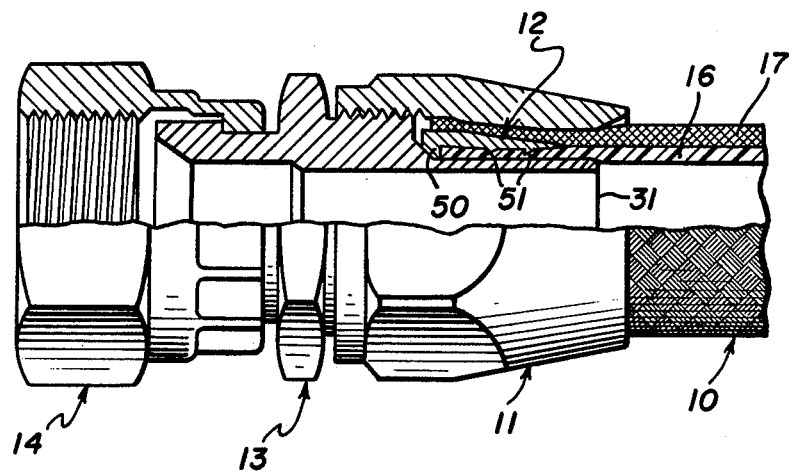
FIG. 3 is a view similar to FIGS. 1 and 2 but showing the parts fully assembled.

The assembly illustrated in FIGS. 1 through 3 includes a tubular flexible hose 10, a socket 11, a sleeve 12, a tubular nipple 13, and a swivel nut 14. The hose 10 includes an inner tube 16 made of a flexible resilient material such as polytetrafluoroethylene, known in the trade as "Teflon," and a wire reinforcement 17 which surrounds the inner tube 16. In the present instance, the wire reinforcement 17 consists of a plurality of layers of braided metal wire.

The socket 11 is normally made from hexagonal bar stock which is machined to produce a tapered outer surface 18 at the forward (toward the right) end thereof. The unmachined outer surface forms a hexagonally shaped wrench engageable portion 19. Internal threads 21 are formed on the rearward end of the socket 11 for attachment with the nipple 13, and an internal tapered gripping section 22 (to be described in more detail hereinafter) is formed forwardly of the threads 21. An internal straight section 23 is formed forwardly of the tapered gripping section 22, the section 23 having an internal diameter which is normally slightly less than the outer diameter of the wire reinforcement 17. Adjacent the forward end of the socket 11, an internal, outward taper, indicated at 24, is provided to reduce stresses on the hose 10 when the hose is bent close to the fitting.

The nipple 13 is also normally made from hexagonal bar stock, and is machined to produce a tubular part 31 having an outer diameter slightly greater than the normal inner diameter of the inner tube 16 of the hose 10. The nipple 13 forms an internal passage 32 having an inner diameter which is only slightly smaller than the inner diameter of the inner tube 16 so as not to impede the flow of fluid through the fitting. Rearwardly of the tubular part 31 are external threads 33 which are engageable with the threads 21 of the socket 11, as shown in FIG. 3. A hexagonal wrench engageable part 34 is left unmachined on the nipple rearwardly of the threads 33 so that the nipple may be held when the nipple and the socket are connected. The threads 33 have a substantially larger diameter than the tubular part 31, and a tapered seal surface 35 is formed between the threads 33 and the part 31.

The swivel nut 14 may have a conventional design, and includes an inwardly projecting part 37 which is received in an annular groove 38 of the nipple 13. The part 37 may be located in the groove 38 as by crimping the forward part of the swivel nut 14. The connection between the swivel nut 14 and the nipple 13 is however sufficiently loose that the swivel nut 14 may be turned relative to the nipple 13. The rearward end of the swivel nut 14 is internally threaded as indicated at 39 so that the swivel nut may be fastened to a coupling (not shown). An internal tapered sealing surface 41 is formed at the rearward end of the nipple 13, which is designed to mate with a sealing surface of the coupling.

The tubular sleeve 12 includes an insert part 46 which is sized to be inserted into the space between the inner layer 16 and the wire reinforcement 17 of the hose 10, as shown in FIG. 2. When a hose is cut, the end of the reinforcement 17 tends to spread or flare as shown in FIG. 1, thus facilitating insertion of the sleeve. The outer surface of the insert 12 is tapered as indicated at 47 to produce a relatively thin forward end, while the outer surface of the rearward half of the sleeve is straight as indicated at 48. On the inner periphery of the insert part 46 are formed a plurality of annular ribs or barbs 51. In the present instance, two barbs are provided. As is better shown in FIGS. 4 to 6, the barbs have a buttress shape with the flat side facing rearwardly of the sleeve. At the rearward end of the insert 12 is formed a radially inward flange 50 having a slanted sealing surface 52 which sealing engages the surface 35 of the nipple 13 when the parts are assembled.

The parts may be assembled by hand using, for example, two wrenches, thereby enabling the fitting and hose to be assembled in the field. After the hose 10 has been cut to length, the socket 11 is slipped over the hose as shown in FIG. 1 and the insert part 46 of the sleeve 12 is pressed into the space between the inner tube 16 and the wire reinforcement 17, as indicated in FIG. 2. After the socket 11 and the sleeve 12 have been mounted on the hose 10, the tubular part 31 of the nipple 13 is forced into the interior of the end of the inner tube 16 in telescoping relation with the sleeve, and the nipple is forced to the right until the sealing surfaces 35 and 52 engage. As shown in FIG. 2, the wire reinforcement 17 extends over tapered portion 47 and the straight portion 48 of the sleeve.

The inner surface of the insert part 46 is radially spaced from the outer surface of the tubular part 31 of the nipple 13, and this space forms a gland pocket 53. The pocket extends from the flange 50 forwardly to the end of the sleeve 12, and the radial width of the pocket 53 is sized, relative to the thickness of the inner tube 16, to be slightly less than the thickness of the inner tube, so that the sleeve 12 and the nipple 13 compress the inner tube 16. The end portion 56 of the inner tube, which is located in the pocket 53, is referred to herein as a gland. The gland 56 is compressed slightly prior to the time the socket 11 is assembled with the other parts, and the two annular barbs 51 bite into the outer surface of the inner tube 16.

Figure 4:
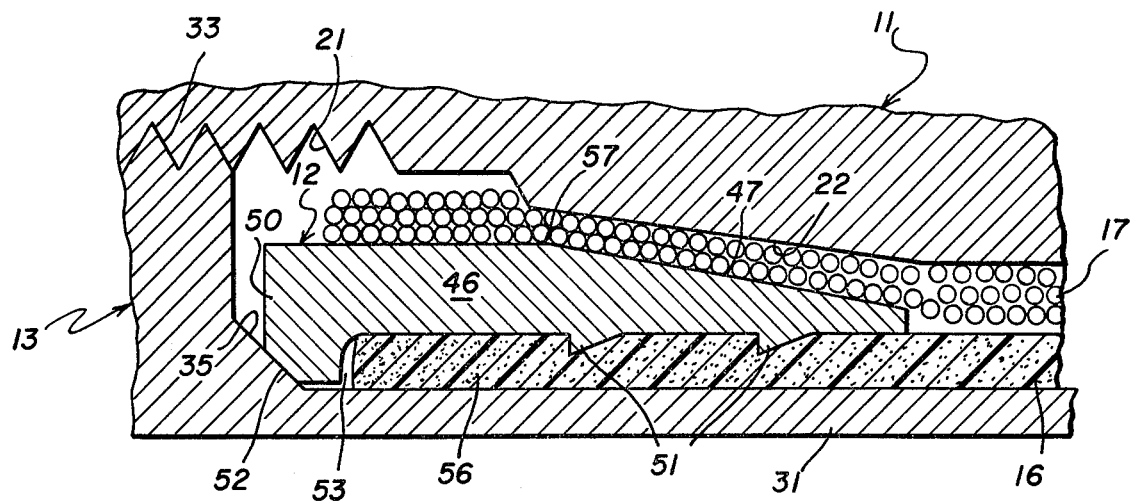
FIG. 4 is an enlarged fragmentary sectional view of the parts during assembly.

The socket 11 is then moved rearwardly to engage the threads 21 and 33, as shown in FIG. 4. The tapered surface 22 overlies the tapered surface 47, and at initial engagement of the threads, the distance between the surfaces 22 and 47 is approximately equal to the thickness of the wire reinforcement 17. Wrenches are then applied to the parts 19 and 34 and the socket 11 is threaded onto the nipple. As the socket 11 moves toward the left relative to the nipple 13, the wire reinforcement 17 is trapped between the tapered surfaces 22 and 47 and the wire reinforcement is tightly gripped therebetween. The sleeve 12 is forced toward the left as seen in FIG. 4 and the tapered sealing surfaces 35 and 52 tightly engage and form a liquid tight seal.

As the socket 11 moves rearwardly relative to the nipple 13 and the sleeve 12, the tapered surface 22 rides up over the tapered surface 47, and the socket applies a very high compressive load on the wire reinforcement 17 and the insert part 46. The insert part is made of a relatively easily deformable material such as soft stainless steel or brass, and the insert part 46 is sufficiently thin that it is deformed radially inwardly during assembly. The annular line 57 (FIGS. 1 and 4) which is formed by the intersection of the surfaces 47 and 48 of the sleeve 12, is deformed or burnished by the pressure of the socket, and it becomes rounded and moves rearwardly a short distance, as will be evident from a comparison of FIGS. 4 and 5.

From FIG. 4 it will be noted that the angle of the tapered surface 22, measured from a horizontal line on the axis of the fitting, is less than the angle of the tapered surface 47. The planes of the surfaces 22 and 47 converge in the direction of movement of the socket as the socket is threaded onto the nipple. Consequently, the compressive load on the sleeve 12 will be concentrated at the rearward area of the tapered surface 47, which is approximately midway along the length of the sleeve 12 and in the area of the rearwardmost of the ribs 51.

Figure 5:
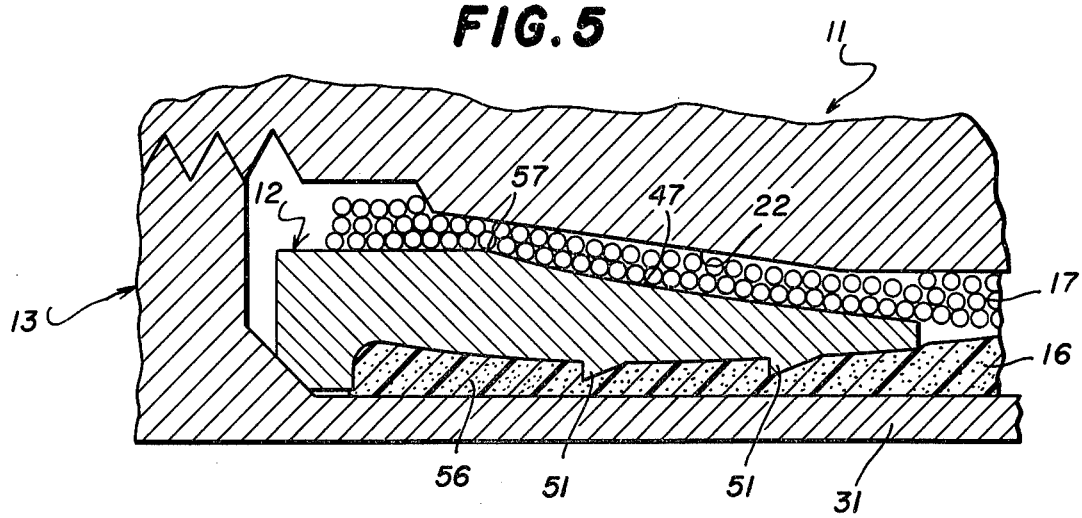
FIG. 5 is a view similar to FIG. 4 but showing the parts fully assembled.

The initial deformation of the insert part 46 occurs just forwardly of the line 57 and radially opposite the ribs 51. Consequently, the ribs 51 are pressed radially inwardly and bite into the inner tube. This is highly advantageous because it locks or holds the gland 56 in the rearward end of the pocket 53. Therefore, continued deformation of the sleeve 12 and increased compression of the gland 56 cannot result in the gland 56 being squeezed out of the pocket 53. As shown in FIG. 5, maximum deformation of the insert part 46, and maximum compression on the gland 56, occurs in the area of the two barbs 51, and the inner surface of the insert part 46 bows downwardly slightly in this area. The deformation of the sleeve 12 is gradual as the socket 11 is assembled with the nipple 13, and the part of the gland 56, which is rearwardly of the barbs 51, is squeezed rearwardly and completely fills the rearward portion of the pocket 53 to the left of the barbs.

A material such as Teflon has "cold flow" characteristics, meaning that it will gradually flow out of an area of high compression. Such flow increases at higher temperatures. This characteristic is not a substantial problem in this fitting because such flow is out of the area of the barbs 51 in both directions. Consequently, there will be a tendency to flow into the rearward end of the pocket 53 and the pocket will continue to be filled.

Figure 6:
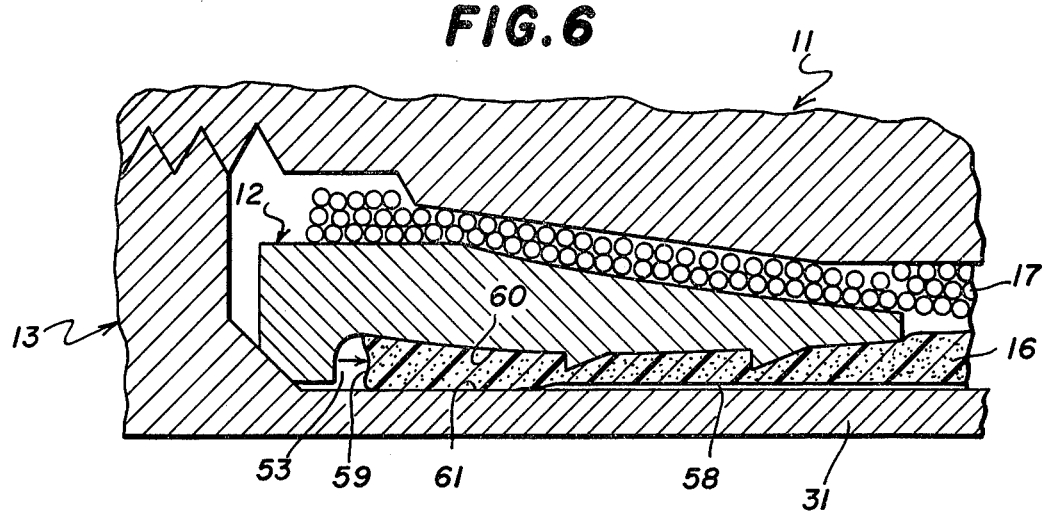
FIG. 6 is a view similar to FIGS. 4 and 5 but showing the parts during use.

FIG. 6 illustrates the functioning of the assembly during use when a medium pressure fluid is contained in the hose 10. As the internal fluid pressure in the hose 10 increases, the fluid tends to work or flow through the interface between the tubular part 31 of the nipple 13 and the inner surface of the inner tube 16. The pressure on the inner tube 16 from the two barbs 51 and forwardly, forms a compression seal between the inner tube 16 and the outer surface of the nipple part 13, which is sufficient to prevent entry of the fluid into the pocket 53 at low pressure. However, under high fluid pressure conditions or after cold flow occurs, some of the fluid under pressure will create an annular space 58 (FIG. 6) between the inner tube 16 and the outer surface of the tubular part 31 of the nipple, and if the fluid pressure is high enough the space will pass the barbs 51 and some of the fluid will move into the rearward end of the pocket 53. This fluid pressure will then also be directed against the rearward end surface 59 of the gland 56 as indicated by the arrow in FIG. 6. This pressure on the end surface 59 presses the gland 56 forwardly against the sloping sleeve surface 60 which is to the rear of the ribs 51, and against the ribs 51. When the pressure at the end surface 59 is sufficiently great, it counterbalances the fluid pressure in the space 58 under the ribs 51, the gland 56 is then pressed tightly against the outer surface of the tubular part of the nipple 13, as indicated at 61. This, in effect, activates the gland seal. In the event the fluid pressure within the hose 10 is reduced, the space 58 will close but the fluid under pressure will be trapped in the rearward end of the pocket 53 and the gland seal will be maintained. If the fluid pressure within the hose 10 is subsequently increased to above the previous fluid pressure level, the fluid pressure may be sufficient to open the space 58 to the rearward end of the pocket 53. However, as soon as this occurs, the fluid pressure reactivates the gland seal at a new, higher pressure level. Consequently, a seal is provided between the tubular part 31 of the nipple and the inner tube of the hose 10, either by virtue of the compression seal or by the operation of the gland seal. Of course, the fluid under pressure in the pocket 53 is prevented from leaking out of the pocket between the sleeve 12 and the nipple 13 because of the metal-to-metal seal formed by the tapered surfaces 35 and 52.

In summary, the fitting has important advantages in that it may be assembled in the field, it includes a compression seal and an effective gland seal.

The fitting may be assembled with a hose using, for example, a pair of wrenches or a vise and a single wrench. This has the advantage that it may be assembled in a factory of shop or in the field.

The tapered surfaces of the socket and the sleeve, the thinness of the sleeve and the type of material of which it is made, cooperate to produce a deformable sleeve. The maximum deformation of the sleeve takes place approximately midway along the length of the sleeve and in the area of the barbs, thus trapping the rearward end of the gland in the pocket. The fluid pressure activates the gland seal by pressing the end of the gland forwardly. Since the cross-sectional area of the pocket decreases in the forward direction, and the barbs 51 prevent the gland from moving forwardly, the rearward end of the gland is prevented from moving forwardly, and the gland is pressed against the nipple to form an effective gland seal.

All of the fitting parts are field attachable, and are not deformed by assembly and use with the exception of the sleeve.

I claim:

1. A field attachable fitting for use with a hose having an inner tube and an outer wire reinforcement, the hose and fitting being adapted to conduct a fluid under pressure, comprising a nipple including a tubular portion, an annular sleeve positioned coaxially with and around said tubular portion and including an insert portion, said tubular portion and said insert portion being radially spaced and forming a pocket therebetween, a socket positioned around said tubular portion and said sleeve, said socket being threadedly connected to said nipple, said fitting having a rearward end where said socket threadedly connects with said nipple and a forward end where the hose extends into said fitting, said socket and said insert portion having closely adjacent tapered surfaces, and said annular sleeve being made of a material which is permanently deformable under the pressure exerted by said socket during assembly, said insert portion being adapted to be positioned between said inner tube and said reinforcement whereby the end portion of said inner tube is received in said pocket and the end portion of said wire reinforcement extends between and is gripped by said tapered surfaces, the radial width of said pocket being slightly less than the normal thickness of said inner tube, whereby said end portion of said inner tube is placed under initial compression, said tapered surface of said insert portion extending from approximately the forward end of said sleeve to an annular break line located substantially midway along the length of said sleeve, the planes of said tapered surfaces converging in the direction of movement of said socket as said socket is threaded onto said nipple, said tapered surface of said socket overlying said break line and applying a highly compressive force through said reinforcement on said break line during the time that said socket is tightened onto said nipple, said force on said insert portion being sufficient to permanently deform the break line area of said insert portion radially inwardly and to reduce said radial width of said pocket as said socket is threaded onto said nipple and to place said end portion of said tube under higher compression, said area being displaced from the inner end of said pocket and the cross-sectional area of said pocket gradually reducing in the direction from said inner end toward said area, whereby any fluid under pressure entering said inner end of said pocket forces said end portion of said tube toward said reduced cross-sectional area, and said end portion is pressed against and forms a seal with both said tubular portion and said insert portion.

2. A fitting as in claim 1, wherein at least one rib is formed on the inner periphery of said insert portion, said rib projecting into said pocket and engaging said inner tube.

3. A fitting as in claim 2, wherein said area of said insert member occurs in the area of said rib.

4. A field attachable hose fitting assembly comprising a hose having an inner tube and an outer wire reinforcement, the hose and fitting assembly being adapted to conduct a fluid under pressure, comprising a nipple including a tubular portion, an annular sleeve positioned coaxially with and around said tubular portion and including an insert portion, said tubular portion and said insert portion being radially spaced and forming a pocket therebetween, a socket positioned around said tubular portion and said sleeve, said socket being threadedly connected to said nipple, said fitting having a rearward end where said socket threadedly connects with said nipple and a forward end where the hose extends into said fitting, said socket and said insert portion having closely adjacent tapered surfaces, and said annular sleeve being made of a material which is permanently deformable under the pressure exerted by said socket during assembly, said insert portion being positioned between said inner tube and said reinforcement whereby the end portion of said inner tube is received in said pocket and the end portion of said wire reinforcement extends between and is gripped by said tapered surfaces, the radial width of said pocket being slightly less than the normal thickness of said inner tube, whereby said end portion of said inner tube is placed under initial compression, said tapered surface of said insert portion extending from approximately the forward end of said sleeve to an annular break line located substantially midway along the length of said sleeve, the planes of said tapered surfaces converging in the direction of movement of said socket as said socket is threaded onto said nipple, said tapered surface of said socket overlying said break line and applying a highly compressive force through said reinforcement on said break line during the time that said socket is tightened onto said nipple, said force on said insert portion being sufficient to permanently deform the break line area of said insert portion radially inwardly and to reduce said radial width of said pocket as said socket is threaded onto said nipple and to place said end portion of said tube under higher compression, said area being displaced from the inner end of said pocket and the cross sectional area of said pocket gradually reducing in the direction from said inner end toward said area, whereby any fluid under pressure entering said inner end of said pocket forces said end portion of said tube toward said reduced cross sectional area, and said end portion is pressed against and forms a seal with both said tubular portion and said insert portion.

* * * * *